(12) United States Patent
Burns et al.

(10) Patent No.: US 6,490,245 B2
(45) Date of Patent: *Dec. 3, 2002

(54) METHOD AND APPARATUS FOR RECOVERING FROM A SIGNALLING FAILURE IN A SWITCHED CONNECTION DATA TRANSMISSION NETWORK

(75) Inventors: John C. Burns, Kanata (CA); Jonathan L. Bosloy, Kanata (CA); David Watkinson, Kanata (CA)

(73) Assignee: Alcatel Canada Inc., Kanata (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/917,714

(22) Filed: Jul. 31, 2001

(65) Prior Publication Data

US 2001/0043561 A1 Nov. 22, 2001

Related U.S. Application Data

(63) Continuation of application No. 09/119,068, filed on Jul. 6, 1998, now Pat. No. 6,292,463.

(51) Int. Cl.$^7$ ............................. H04J 1/16; G01R 31/08
(52) U.S. Cl. ..................... 370/216; 370/244; 370/395.2
(58) Field of Search .............................. 370/216–228, 370/395.2, 242, 244, 246–54, 395.1, 431, 433, 437, 237, 395.3, 395.32

(56) References Cited

U.S. PATENT DOCUMENTS 5,436,895 A * 7/1995 Matsumoto ................. 370/391
5,933,412 A * 8/1999 Choudhury et al. ......... 370/218
6,151,390 A * 11/2000 Volftsun et al. ............. 370/467
6,272,107 B1 * 8/2001 Rochberger et al. ........ 370/216
6,292,463 B1 * 9/2001 Burns et al. ................. 370/216
6,311,288 B1 * 10/2001 Heeren et al. ................. 714/4

OTHER PUBLICATIONS

Russell, Travis, Signaling System #7, 1995, McGraw Hill, PP:172–189.*

* cited by examiner

Primary Examiner—David Vincent
(74) Attorney, Agent, or Firm—Blake, Cassels & Graydon LLP; Alfred A. Macchione

(57) ABSTRACT

A method of re-establishing a communications connection in a network element, a network element and a switched connection communications network are provided. The communications connection is re-established after a failure occurs affecting the communications connection. The network element is a network element in a switched connection communications network over which the communications connection is provisioned in a source-to-destination bearer path. The bearer path includes a cross-connection in the first-mentioned network element. The cross-connection is associated with the communications connection prior to the failure at a time when the communications connection is provisioned. The method includes the steps of: (a) delaying release of the cross-connection following the failure and (b) during the delayed release, determining whether the cross-connection remains operable notwithstanding the failure and, if so, re-associating the operable cross-connection with the communications connection to thereby re-establish same over at least that portion of the bearer path which includes the cross-connection.

65 Claims, 8 Drawing Sheets

| 8 | 7 | 6 | 5 | 4 | 3 | 2 | 1 | Octet |
|---|---|---|---|---|---|---|---|---|
| 0 | 0 | 0 | 0 | 0 | 1 | 0 | 0 | 1 |
| 1 Ext | 0 Coding Std. | 0 | 1 Flag | 0 Res | 0 | 0 IE action Ind | 1 | 2 |
| Length of CallId IE ||||||||  3 |
| Length of CallId IE (continued) |||||||| 4 |
| Node Address Format |||| Creator |||| 5 |
| Call Num |||||||| 6.1 |
| Call Num (continued) |||||||| 6.2 |
| Call Num (continued) |||||||| 6.3 |
| Call Num (continued) |||||||| 6.4 |
| Node Address |||||||| 7.1 |
| Node Address (continued) |||||||| 7.2 |
| Node Address (continued) |||||||| 7.3 |
| Node Address (continued) |||||||| 7.4 |

Octets 6.1–6.4 are labeled 36; octets 7.1–7.4 are labeled 34; octet 5 is labeled 38.

METHOD AND APPARATUS FOR RECOVERING FROM A SIGNALLING FAILURE IN A SWITCHED CONNECTION DATA TRANSMISSION NETWORK

This application is a continuation of U.S. patent application Ser. No. 09/119,068 filed Jul. 6, 1998, now U.S. Pat. No. 6,292,463.

FIELD OF INVENTION

The invention generally relates to the field of data transmission networks and more specifically to apparatus and methods for recovering from a short-term signalling network failure in a switched connection data transmission network employing a signalling protocol for establishing, maintaining and clearing a call.

BACKGROUND OF INVENTION

In a switched connection network, examples of which include the public switched telephone network and virtual connection orientated digital communications such as asynchronous transfer mode (ATM) networks, an end-to-end call comprises one or more switched (i.e., on-demand) bearer channels which collectively compose a bearer channel path across a network. In an ATM network for instance, examples of such a switched call include a switched virtual connection (SVC) or a soft permanent virtual connection (SPVC). Such calls are (or can be) dynamically established and cleared in substantially real time by network elements, such as data transmission switches, in accordance with standard signalling protocols. An example of one such network element which incorporates signalling software is the model 36170 MainStreet Xpress(TM) ATM network switch commercially available from Newbridge Networks Corporation of Kanata, Ontario.

The signalling between network elements is carried over a signalling network comprising call control and processing infrastructure disposed on each network element, and means for interfacing or communicating between similar infrastructure disposed on counterpart network elements. The interface means can comprise a separate overlay network, such as leased lines, as may be found in a Frame Relay SVC service. More typically, however, the interface means comprises a permanent virtual connection (PVC) which has been dedicated for the transfer of signalling information or call control data between interconnected network elements. For example, one popular ATM standard has dedicated VPI/VCI=0/5 for this purpose. Signalling virtual circuits can be carried over the same internode link facilities as the bearer channels, or on separate links.

In order to initiate an end-to-end call, the calling device typically transmits a "call setup" message to the network indicating the destination address and desired connection and quality of service parameters. For SVC service, the calling and called devices are typically customer premise equipment (CPE). For SPVC service, the calling and called devices are typically ingress and egress network elements, as described in greater detail below.

The call set up message can be propagated through the network to a called device (destination address) using conventional routing techniques, such as hop-by-hop or source routing. In hop-by-hop routing, each network element which receives the call setup message typically consults a routing table in order to determine the next hop or output bearer channel towards the destination. In source-routing, the source or ingress network element maintains a database of the topology of the network and specifies the output ports and virtual path (VP) trunk that each network element should use to route the call.

Each network element which receives the call setup message establishes a bearer channel cross-connect which links an input bearer channel to an output bearer channel.

Ultimately, the call setup message is relayed by the signalling network to the called device, and the called device is thus informed as to the identity of the bearer channel it should use for transmitting information in respect of the call. Once the call setup message is received at the destination device, a "connect" message is sent back over the signalling network to the calling device. Typically, the calling device will then transmit a "connect acknowledgement" message back to the destination device over the signalling network in order to complete a double handshaking protocol. At this point, the call is deemed to have been established and the calling device, as well as the called device in the event of a bidirectional connection, may transmit user data over the recently established bearer channel path.

The signalling network is also used to clear or terminate a call and its associated bearer channel path in a manner similar to that used to establish the call.

In addition to dynamically establishing and clearing a call, the signalling network is also used to transmit various types of status messages (e.g. link state messages) relating to the call and the bearer channel path thereof. These status messages are associated with various sensing mechanisms employed by the signalling standards for determining whether a peer entity (e.g., a signalling module on a CPE or network node) or link therebetween is alive and properly functioning. Such mechanisms typically include heartbeat processes relating to various layers of a signalling protocol, such as described in greater detail below.

The signalling network, or more particularly a portion thereof, may fail for various reasons, including a software defect or equipment failure in the call control infrastructure. When a failure is sensed as described above by other network elements adjacent to the failed portion of the signalling network, the signalling standards typically specify that all calls affected by the failure should be released, thus causing all of the bearer channel cross-connects relating to those calls to be released. If a call control entity, for example, a call processor supporting switched virtual circuit (SVC) services on a first network element fails, all of the signalling interfaces with other network elements managed by the card will be lost. Adjacent network elements will thus presume that the bearer channels associated with the failed signalling interfaces are no longer operable. This causes the adjacent network elements to signal this fact across the network and release all cross-connects to the bearer channels composing the call. Ultimately, the failure in the signalling network will be signalled back to the calling and called devices, which will terminate their session.

The release of bearer channel cross-connects is very disruptive to calls if there has in fact been no failure in the bearer channels or their cross-connects (i.e., the bearer channel path is up and functioning) and the failure in the signalling network can be corrected within a short period of time. For example, in network elements featuring "1+1 warm redundancy" or "N+1 warm redundancy", backup or stand-by call control infrastructure, e.g. a stand-by SVC service card, could be switched into service in place of the failed card. Unfortunately, as the information base on the failed card is lost, the prior art does not enable the backup card to carry on in midstream the numerous signalling functions handled by the failed call control infrastructure.

One approach to this problem is to employ "1+1 Hot Redundancy" where each component of the call control infrastructure is actively duplicated in which case bearer channel cross-connects need not be released since the redundant component maintains a parallel up-to-date date information base. Such systems are, however, not always available or desired due to the extra costs involved.

SUMMARY OF INVENTION

In a first aspect, a method of re-establishing a communications connection in a network element after a failure occurs affecting the communications connection is provided. The network element is a network element in a switched connection communications network over which the communications connection is provisioned in a source-to-destination bearer path. The bearer path includes a cross-connection in the first-mentioned network element. The cross-connection is associated with the communications connection prior to the failure at a time when the communications connection is provisioned. The method includes the steps of: (a) delaying release of the cross-connection following the failure and (b) during the delayed release, determining whether the cross-connection remains operable notwithstanding the failure and, if so, re-associating the operable cross-connection with the communications connection to thereby re-establish same over at least that portion of the bearer path which includes the cross-connection.

Determining whether the cross-connection remains operable notwithstanding the failure may include determining whether the first-mentioned network element is capable of communicating with an immediately adjacent network element in the bearer path.

The switched connection communications network may include a signalling network for establishing, maintaining and clearing a communications connection in the switched connection communications network and the failure may occur in the signalling network.

The failure may occur in a card associated with the signalling network at the first-mentioned network element.

Following the failure and prior to the step (a), the switched connection communications network may indicate existence of the failure to the first-mentioned network element to release the cross-connection following the failure and the step (a) of delaying release of the cross-connection following the failure may occur for a pre-determined period of time.

The switched connection communications network may include a call control infrastructure and the method may further include the step of: (a1) releasing the communications connection from the call control infrastructure following the failure and prior to step (b).

The call control infrastructure may be disposed on the first-mentioned network element.

The call control infrastructure may indicate existence of the failure to a network element in the bearer path to release the cross-connection following the failure.

The network element to which the failure is indicated may not be customer premise equipment.

The signalling network may include an interface for communicating signalling information between the network elements in the bearer path.

The interface may include a signalling link.

The first-mentioned network element may include a connection manager disposed on the first-mentioned network element for creating and dismantling cross-connections thereon.

The method may further include the step of: (b1) if the communications connection is re-established over the portion of the bearer path which includes the cross-connection within the pre-determined period of time, aborting the release of the cross-connection for the first-mentioned network element.

Following the failure, the switched connection communications network may transmit a setup message to the first-mentioned network element to initiate step (b).

The cross-connection may be associated with the communications connection at the time when the communications connection is provisioned by associating the cross-connection with a unique identifier in respect of the communications connection.

The setup message may include the unique identifier and the operable cross-connection may be re-associated with the communications connection by re-associating the cross-connection with the unique identifier.

The communications connection may have an ingress network element and an egress network element in the switched connection communications network and the setup message may be transmitted in the switched connection communications network by the ingress network element or the egress network element.

The unique identifier may include a field representative of the ingress network element and a field representative of a number which is unique with respect to the communications connection.

The unique identifier may further include a field representative of a creator of the communications connection.

Re-associating the cross-connection with the unique identifier may include linking the unique identifier with an entry in a data structure representing existing cross-connections on the first-mentioned network element.

The communications connection may be a switched virtual connection.

The communications connection may be a soft permanent virtual connection.

If the first-mentioned network element determines that the cross-connection is not operable, the first-mentioned network element may establish an alternate cross-connection for the communications connection and may re-route the communications connection in the switched connection communications network.

In a second aspect, a network element for use in re-establishing a communications connection after a failure occurs affecting the communications connection is provided. The network element is one of at least one network element in a switched connection communications network over which the communications connection is provisioned in a source-to-destination bearer path. The bearer path includes a cross-connection in the first-mentioned network element. The cross-connection is associated with the communications connection prior to the failure at a time when the communications connection is provisioned. The network element includes a cross-connection release unit for delaying release of the cross-connection following the failure and a cross-connection re-association unit for re-associating, during the delayed release, the cross-connection with the communications connection to thereby reestablish same over at least that portion of the bearer path which includes the cross-connection if the cross-connection remains operable notwithstanding the failure.

In a third aspect, a switched connection communications network for use in reestablishing a communications connection after a failure occurs affecting the communications connection is provided. The switched connection communications network includes a failure detection unit for detecting a failure in the switched connection communications network and at least one network element over which a bearer path of the communications connection is provisioned. The bearer path includes a cross-connection respectively in each of the at least one network element. Each cross-connection is associated with the communications connection prior to the failure at a time when the communications connection is provisioned. Each the network element in the bearer path is operative to delay release of the cross-connection thereof following the failure and, during the delayed release, to determine whether the cross-connection remains operable notwithstanding the failure and, if so, to re-associate the operable cross-connection with the communications connection to thereby re-establish same over at least that portion of the bearer path which includes the cross-connection.

BRIEF DESCRIPTION OF DRAWINGS

The foregoing and other aspects of the invention are described in greater detail below with reference to the following drawings, provided for the purpose of description and not of limitation, wherein.

DETAILED DESCRIPTION OF PREFERRED EMBODIMENT

The invention is first described in detail from the perspective of the operation of the network as a whole, and then from the perspective of the role and structure of an individual network element.

Figure 1:
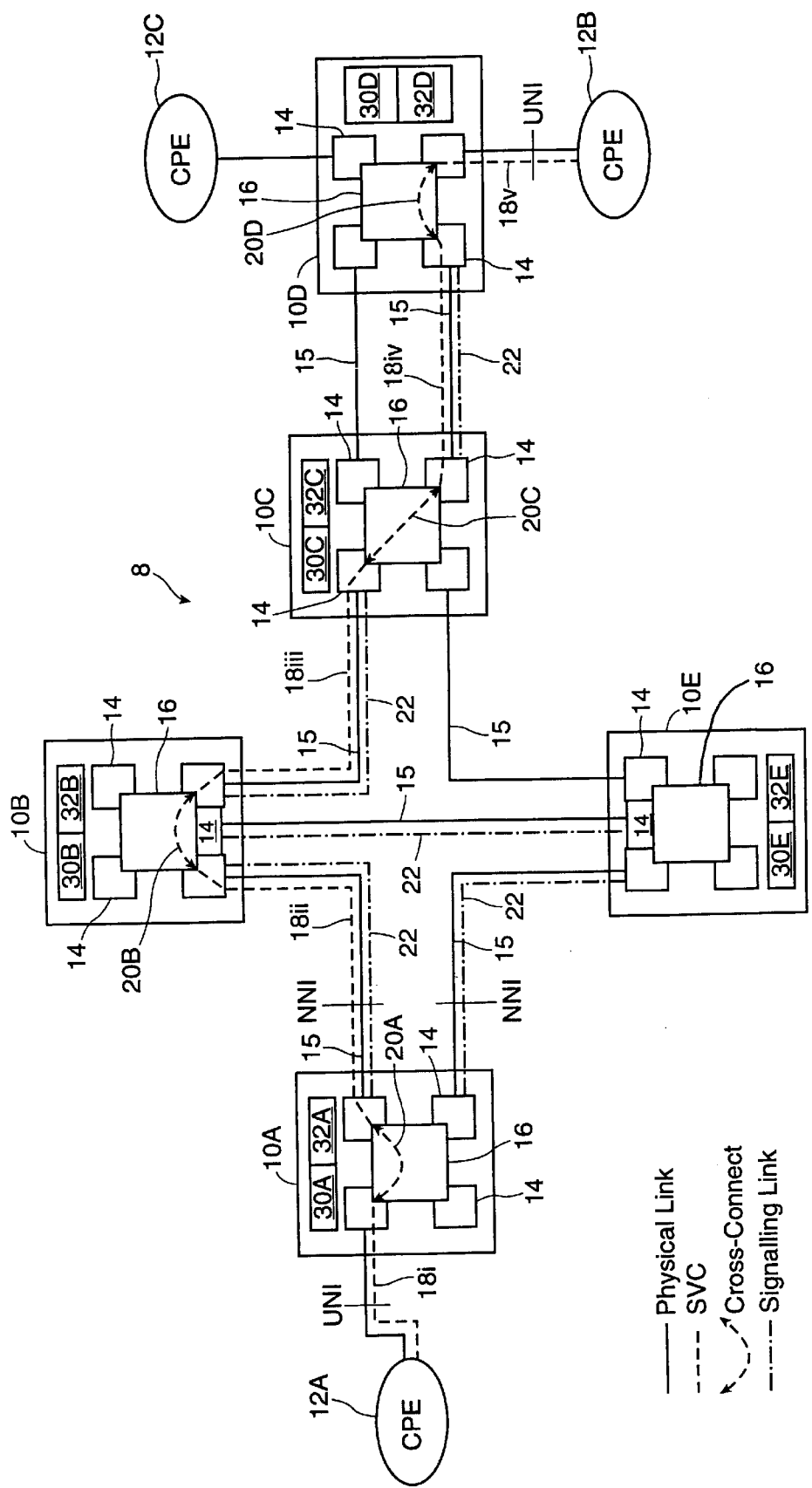
FIG. 1 is an illustration of a reference network comprising a plurality of interconnected network elements and customer premise equipment.

The preferred network environment relates to an ATM network employing 36170 MainStreet Xpress(TM) switches as backbone network elements. FIG. 1 illustrates an exemplary network 8 comprising a plurality of interconnected 36170 switches 10. Individual switches are identified by an alphabetical suffix, e.g., A, B, etc., and elements of a given switch are also generally labelled with the same suffix used to identify the switch.

CPE 12A, 12B and 12C are connected to the network 8. The CPEs communicate with the network 8 by well known ATM UNI standards.

The switches 10 include various ports 14 which are physically interconnected by physical links 15. These physical links comprise standard physical interfaces, such as OC-3, OC-12 or DS3 fibre optic and electrical interfaces.

Figure 2:
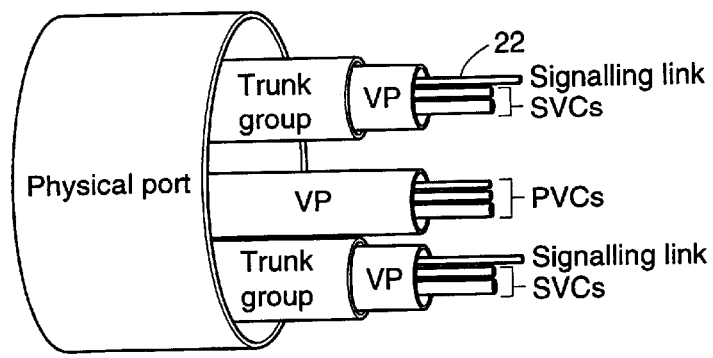
FIG. 2 is an illustration of a preferred logical portioning of the bandwidth of a physical interface or port associated with a network element.

FIG. 2 shows how the bandwidth of physical port 14 is logically partitioned in the 36170 switch 10 into trunk groups, VPs, VCs, and associated signalling links. The signalling link (ref. no. 22 in FIG. 1) is typically a PVC dedicated for the communication of signalling information between network switches with respect to a group of SVCs associated with a given trunk group. Each signalling link 22 between network switches 10 is established and configured, for example via a network management system, before SVC traffic can be carried over the associated trunk group.

In the reference network illustrated in FIGS. 1 and 2, routing tables 16 associated with switches 10 are configured to enable CPE 12A to communicate with CPE 12B over a bearer channel path, such as SVC 18, which comprises a plurality of uni- or bi-directional bearer channels, such as virtual channels 18$i$, 18$ii$, 18$iii$, 18$iv$, and 18$v$. The routing tables 16 dictate the egress ports for bearer channel cross-connects 20 required to form an end-to-end switched connection or bearer channel path between CPE 12A and CPE 12B.

Each switch 10 comprises a call control and processing infrastructure 30, as described in greater detail below, for managing calls and implementing signalling protocols, and a connection manager 32, also described in greater detail below, which is responsible for creating and releasing the cross-connects 20. The call control infrastructure disposed on each of adjacent switches communicates over signalling links 22 established between each successive pair of switches 10 along the path of SVC 18. Collectively, the call control infrastructure 30 and signalling links 22 compose a signalling network operative to implement a signalling protocol, such as the NNI ATM Forum Interim Inter-switch Signalling Protocol (IISP) well known in this art.

Figure 3:
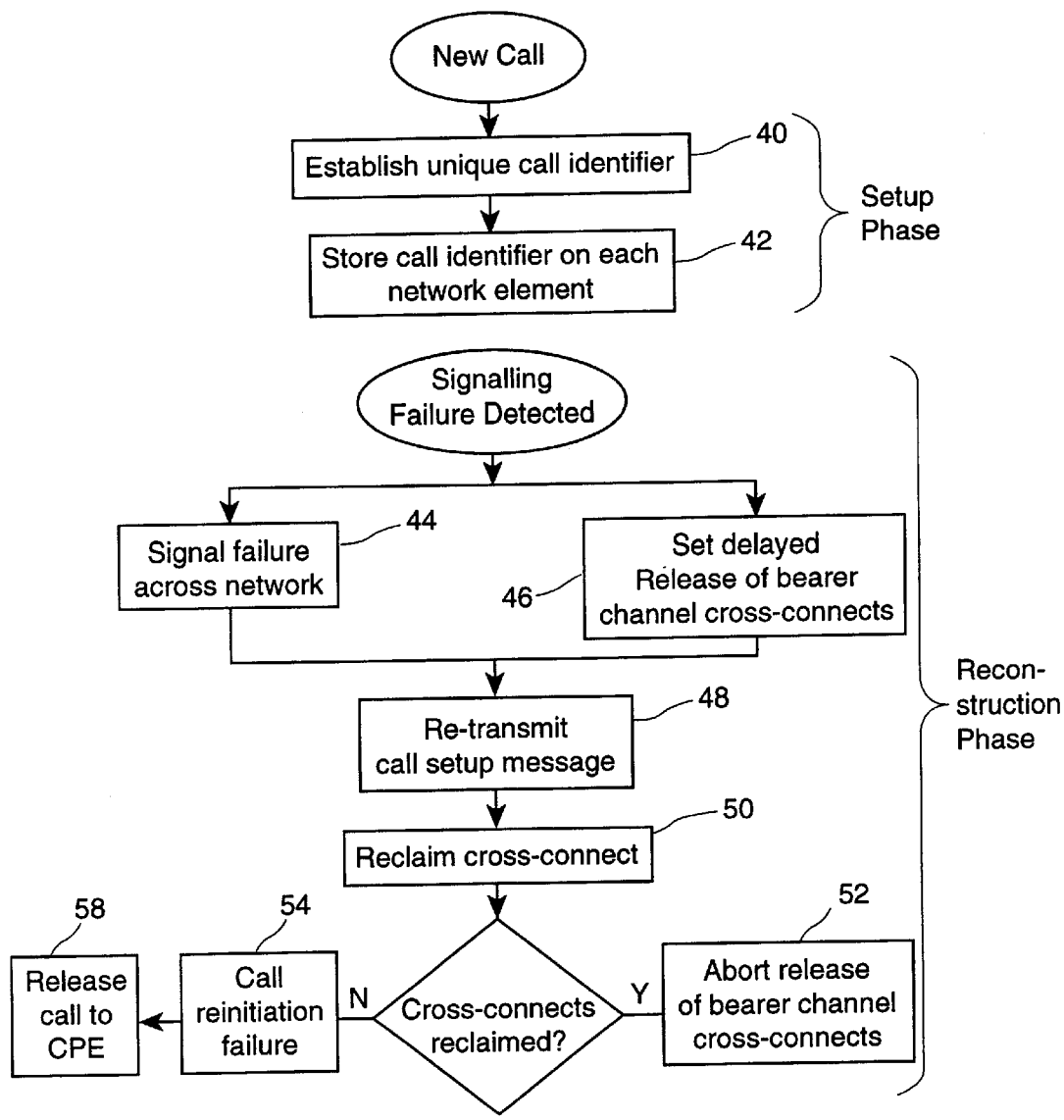
FIG. 3 is a flowchart of a network process for maintaining the survivability of bearer channel cross-connects in the event of a recoverable failure in a signalling network, in accordance with the preferred embodiment.

Referring additionally to the flowchart of FIG. 3, in a first phase of the method according to one preferred embodiment, the network 8 is configured to be able to reconstruct SVC 18 in the event of a recoverable failure in a portion of the signalling network.

As indicated by a first step 40, the network 8 establishes a unique network-wide call identifier to identify SVC 18. This is preferably accomplished by ingress switch 10A when it receives a call setup message from CPE 12A over the UNI there between to initiate the setup of SVC 18. The call setup message is processed by call control infrastructure 30A on switch 10A as known in the art in order to determine the next hop in routing the call, which, in the reference network of FIG. 1, is switch 10B. Accordingly, the call control infrastructure 30A instructs connection manager 32A to create cross-connect 20A. The call control infrastructure 30A at step 42 locally stores the call setup message (or information contained therein), in order to resend said message in the event of a signalling link failure. In addition, call control infrastructure 30A prepares to forward a similar call setup message over the NNI between switch 10A and switch 10B. In doing so, call control infrastructure 30A includes a particular call identifier information element (IE) in the call setup message, in addition to the conventional IEs carried by the call setup message, to forward the unique call identifier to the other switches.

Figures 4, 5:
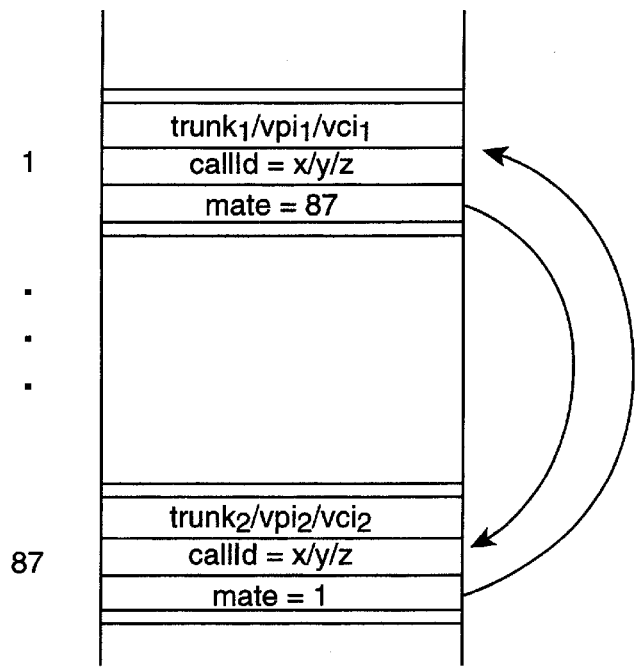
FIG. 4 is a diagram of an information element incorporated in an NNI call setup message in accordance with the preferred embodiment.
FIG. 5 is a diagram of an example of an active call table used in a network element.

The preferred structure of the call identifier IE is illustrated in FIG. 4. The data portion of this IE preferably comprises three fields which uniquely identify a call such as SVC 18: a four byte field 34 representing the source switch (alternatively referred to in the art as the "source point" code); a four byte field 36 representing a number selected by the source switch which is a unique number with respect to the source switch; and a four bit field 38 representing the creator of the call, which can be either the source switch, e.g., in the case of an SVC, or a network manager, e.g., in the case of an SPVC. Collectively, these three fields uniquely identify a call such as SVC 18.

In step 42 of the FIG. 3 flow chart, the unique call identifier is stored on each network element traversed by the call. This function is preferably carried out as the call setup message is routed across network 8 to egress switch 10D. Each switch 10 which receives the call setup message processes it in the preferred manner described above. More particularly, the call control infrastructure 30 on each switch (including ingress switch 10A) executes, if required, a routing function in order to determine an egress VP trunk. Routing communicates the egress VP trunk, which inherently identifies the egress port 14 and a VPI, to the connection manager 32 which selects a VCI for the bearer channel between the given switch and the next switch, as described in greater detail below. The call control infrastructure 30 also passes the unique call identifier in the call setup message to connection manager 32 which preferably stores the call identifier in a cross-connect table employed by the connection manager for its internal management. In this manner, the connection manager 32 and hence switch 10 uniquely identifies cross-connect 20 as being associated with SVC 18. An example of a cross-connect table employed by connection manager 32 is illustrated in FIG. 5, wherein the unique identifier for SVC 18 labelled "x|y|z". Both endpoints associated with the same cross-connect are represented and the mate field identifies its counterpart endpoint.

Alternatively, for more efficient recovery, the call setup message or information therefrom can be stored at each node the call traverses. This allows resignalling of the call setup to be effected earlier within the network instead of back at the ingress switch 10A. The call setup information maintained at each switch includes, as a minimum, the destination address and the unique call identifier.

In a second phase of the method according to the preferred embodiment, the network 8 attempts to reconstruct SVC 18 in the event of a recoverable failure in the signalling network, e.g. if a portion of failed call control infrastructure can be quickly repaired.

Figure 6:
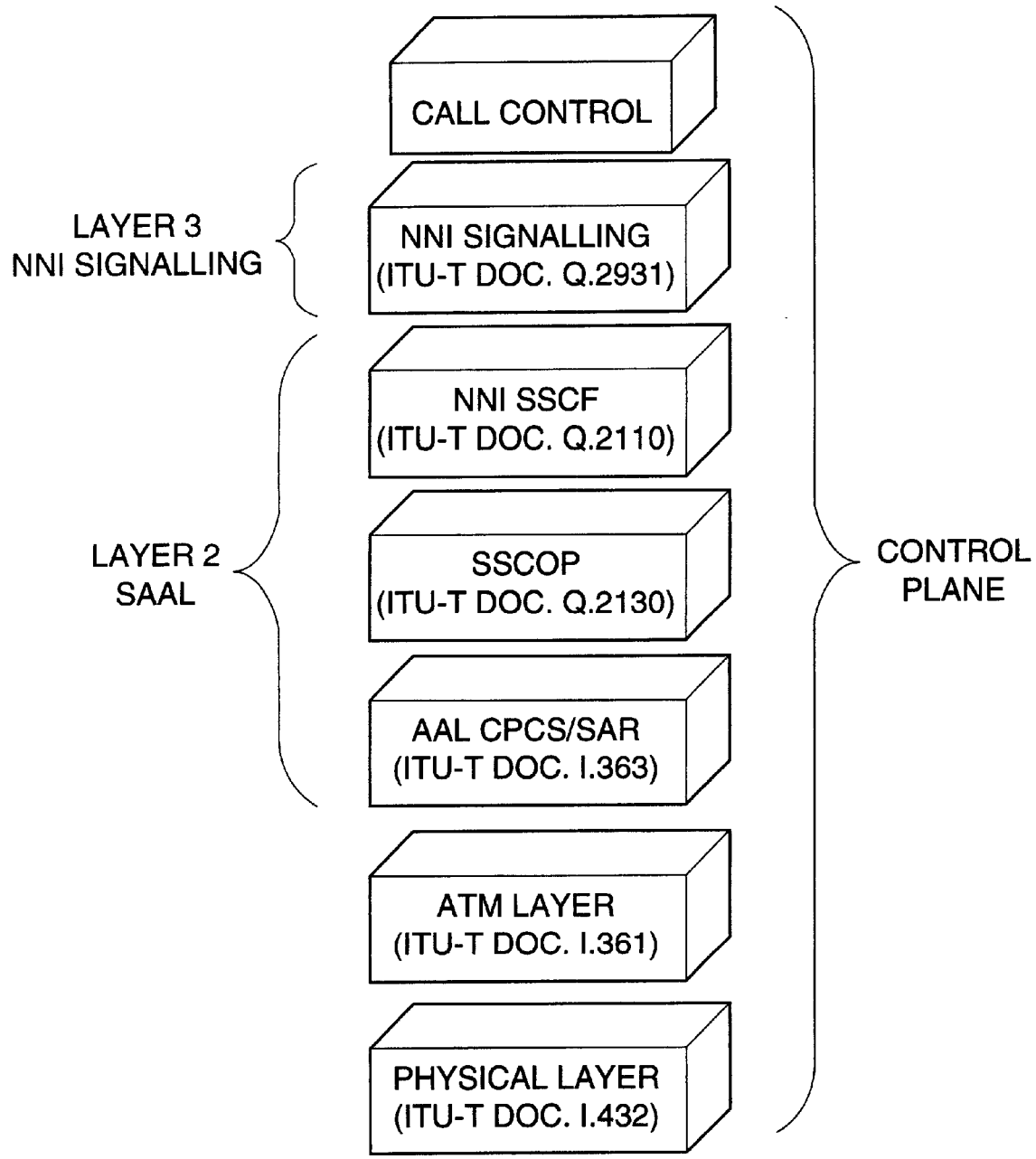
FIG. 6 is a diagram of the control plane in an ATM NNI signalling protocol stack.

As a precursor, switch 10 must be able to sense signalling network failures. One way this can be accomplished is by call control infrastructure 30 which implements the control plane of an ATM signalling protocol stack shown in FIG. 6. The functionality of the control plane is well known to those skilled in this art, and particulars thereof can be found in the following references, all of which are incorporated herein by reference:

Trillium Digital Systems, Inc., "Trillium ATM Signalling White Paper", Apr. 30, 1996, Los Angles, Calif.;

Boger, Yuval S., "An Introduction to ATM Signalling", June 1995, Radcom Ltd., Tel Aviv, 69710, Israel;

McDysan and Spohn, "ATM Theory and Application", McGraw-Hill, New York, N.Y., 1994;

ATM Forum. "ATM User-network Interface (UNI) Signalling Specification", version 4.0, document no. af-sig-0061.000, July 1996; and ATM Forum, "Interim Inter-switch Signalling Protocol (IISP) Specification v 1.0", document no. af-pnni-0026.000, December, 1994.

Once SVC 18 has been established, the call control infrastructure 30 uses the signalling network to exchange various types of status messages relating to a call such as SVC 18. An example of a pair of such status messages is the UNI or NNI ATM signalling layer 3, "status enquiry" and "status" messages. These messages are associated with a polling process designed to solicit status information from a peer element (node or CPE) with respect to a given call or SVC when there appears to be an error in the communication there between. In this manner, the device which sends out the status enquiry request can ascertain whether or not the opposite side is indeed alive and properly functioning.

Other types of status messages used in the maintenance of a call are germane to the signalling links 22 between network switches. For example, the UNI or NNI Signalling ATM Adaptation Layer 2 (SAAL) (layer 2 in the ATM signalling protocol stack) is provided to ensure a reliable signalling link for a given trunk group between switches. The SAAL protocol constantly sends some protocol messages or data units (PDUs) to a switch on the other side of the link which must be acknowledged by the other switch. These messages may be sequenced data PDUs, i.e. PDUs which carry NNI layer 3 signalling messages for all virtual connections of a trunk group, or separately sequenced "poll" and "stat" PDUs. In combination, these messages implement a keep-alive or heartbeat polling process associated with each successive pair of switches 10 along the bearer channel path of a call such as SVC 18 in order to inform each switch that a VP trunk (which may consist of one or more bearer channels) to its counterpart is alive and functioning. In the foregoing manner, call control infrastructure 30 can determine whether or not an entire trunk is alive and functioning.

As indicated in steps 44 and 46 of the FIG. 3 flowchart, once a signalling failure is detected, the signalling failure is communicated across the network and the network actuates a timed or delayed release of the bearer channel cross-connects affected by the signalling failure. Switches typically maintain linked lists of calls associated with respective signalling link, and upon detecting failure of one such link, a release message is signalled for each call controlled by that link. Each switch having one or more cross-connects of calls associated with the failed signalling link implements this timed release of those cross-connects in respect to receipt of corresponding release messages.

For example, assume that an SVC service card (discussed in greater detail below) associated with call control infrastructure 30B on switch 10B fails. The signalling links 22 to switches 10A and 10C will thus fail. Call control infrastructure 30A and 30C sense the failure as described above and respectively assume that virtual connections or bearer channels 18ii and 18iii are down or non-operative. Call control infrastructure 30C signals this presumed fact to call control infrastructure 30D on switch 10D. However, the ingress switch 10A and egress switch 10E do not signal the failure back to CPE 12A and CPE 12B. This is because in practice the CPE may be produced by manufacturers other than the manufacturer of the network equipment, and thus the CPE is liable to terminate the call, counter to the goal of the invention. SVC 18 may thus be considered to be a "resilient" SVC, meaning that it does not get released all the way to the source and destination CPE when recovering from a network failure. Of course, if CPE 12A and 12B can be programmed in a manner similar to switches 10, as described in greater detail below, so as not to terminate SVC 18, the CPE may be signalled about the failure.

In the preferred embodiment, the release signal received by switch 10 comprises a conventional layer 3 ATM call release signal which includes a "cause IE", as known in the art, carrying diagnostic data specifying the reason for the release. The diagnostics data includes an organization unique identifier (OUI) specifying how an accompanying diagnostics code should be interpreted. In the preferred embodiment, the diagnostics code includes an organization-specific code diagnosing a signalling network failure and instructing the switch to release the call from the perspective of the call control infrastructure, but to not immediately dismantle the cross-connect of the affected call. Instead, each call control infrastructure 30 informs its corresponding connection manager 32 to begin a delayed release of each bearer channel cross-connect 20. This is preferably accomplished by setting a countdown timer which triggers each connection manager 32 to dismantle cross-connect 20 after a specified time period has elapsed. In this manner, the call control infrastructure across the network releases the call or SVC 18, but for a limited time period the bearer channel cross-connects survive the failure in the signalling network, thereby allowing CPE 12A and 12B to continue to communicate there between.

In step 48 of the FIG. 3 flowchart, the NNI call setup message incorporating the previously created unique call identifier is retransmitted across network 8 in order to re-establish SVC 18. This is preferably accomplished by call control infrastructure 30A on ingress switch 10A which, once it detects a signalling failure relating to SVC 18, can ascertain that it is the source switch based on the unique call identifier, as described in greater detail below. If desired, the ingress call control infrastructure 30A can be configured to wait for a short time period before re-transmitting the NNI call setup message in order to allow the signalling network some time to recover.

In alternative embodiments, it will be appreciated that network 8 can be configured so that egress switch 10D retransmits the call re-setup message across the network. Also, a call release message might only be signalled from the nodes detecting a failed signalling link over successive nodes in the path towards the edges of the network, until one of those nodes, which stored information from the original call setup message is able to generate an appropriate call re-setup message to reclaim the corresponding cross-connect and/or route around the failure.

In step 50 of the FIG. 3 flowchart, network 8 attempts to reclaim the surviving cross-connects 20. This is preferably accomplished by each switch 10 during the re-establishment of the call as each call control infrastructure 30 instructs its corresponding connection manager 32 to create a cross-connect 20 for SVC 18. The connection managers 32 inspect their local cross-connect tables to determine whether or not an active cross-connection is labelled or tagged with the unique call identifier included in the call re-setup message. If so, and the appropriate signalling link for the next node hop is operational, connection managers 32 "reclaim" the existing cross-connects by not establishing new cross-connects and, as shown in step 52, by aborting the timer countdowns which were previously set in step 46 to release the cross-connects. Otherwise, the cross-connects are torn down and the switch 10 attempts to re-route the call. If no match is found, call control infrastructure also attempts to re-route by consulting corresponding global routing table 16 in order to determine a new egress VP trunk which may route the call through a port/VPI/VCI other than the original egress port/VPI/VCI.

As indicated in step 54 of the FIG. 3 flow chart, a call re-initiation failure occurs in the event the failure in the signalling network is not recoverable so that the retransmitted call setup message cannot proceed to CPE 12B. For example, consider a situation in FIG. 1 where physical interface 15 between switches 10B and 10C is destroyed. Switch 10B will then not receive an acknowledgement back from switch 10C in response to the re-transmitted call setup message forwarded to it. Accordingly, connection manager 32B will time out waiting for the acknowledgement and will release or delete reclaimed cross-connect 20B from its local cross-connect table in accordance with the NNI protocol. Switch 10A will similarly time out, release cross-connect 20A, and inform CPE 12A over the UNI there between that SVC 18 is released. Meanwhile, on the other side of the network, switch 10D never receives the re-transmitted NNI call setup message and thus the timer set in step 46 will time out thereby causing the surviving cross-connect 20D to be released, and initiating the transmission of a call release message to CPE 12B. In general, if a cross-connect is not reclaimed once the time expires, the cross-connect is freed or available for use by another call.

Figure 7A:
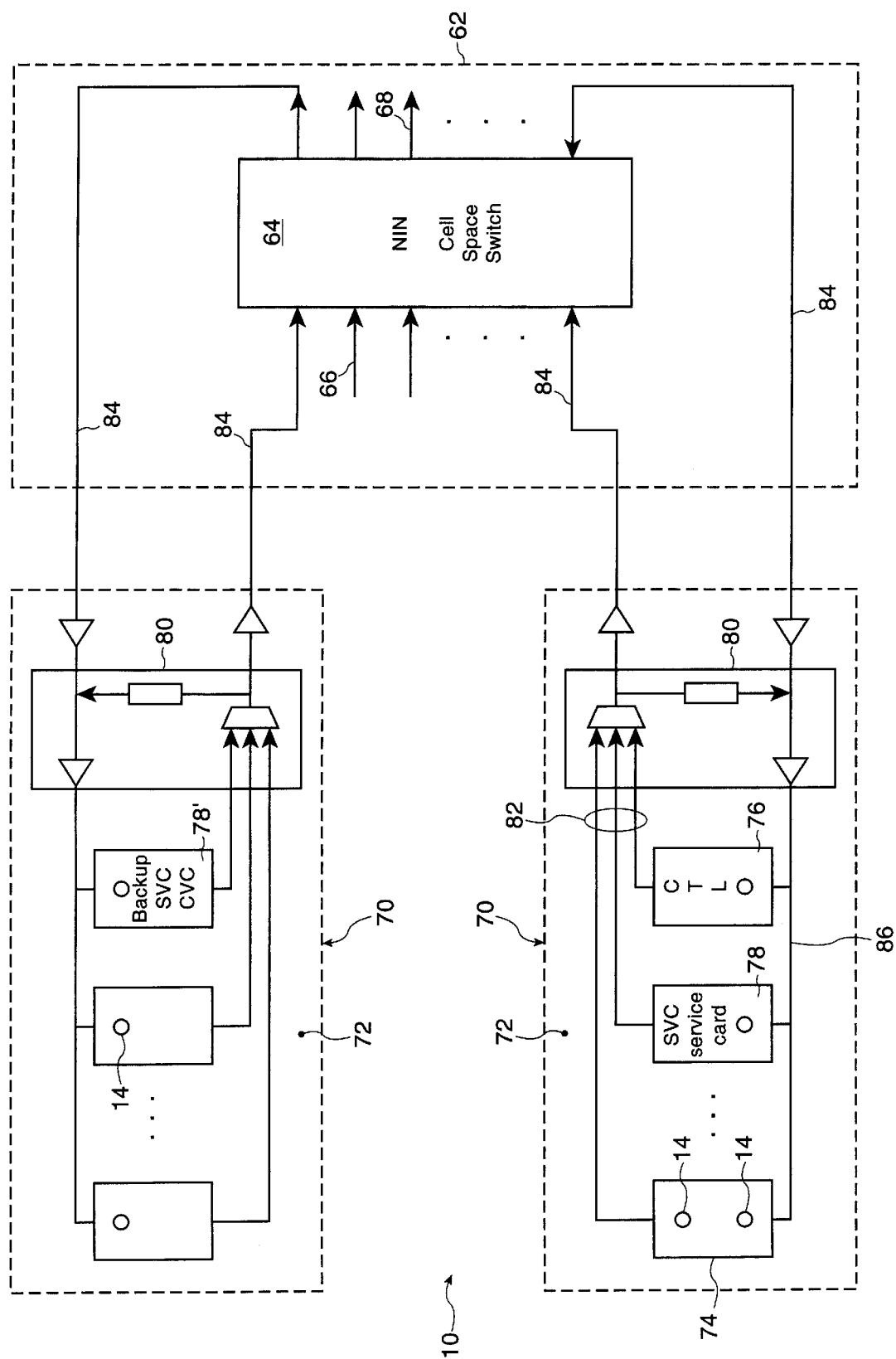
FIG. 7A is a system block diagram of the hardware architecture of a preferred network element.

The structure and role of the preferred switch 10 is now discussed in greater detail. FIG. 7A is a system block diagram of the 36170 MainStreet Xpress(TM) network switch 10. The switch 10 comprises a switching fabric 62, including a high capacity cell space switching core 64 having N inputs 66, any of which can be switched to one or more of N outputs 68. Switch 10 further comprises one or more access or peripheral shelves 70 (two shelves 70 being shown). Each peripheral shelf 70 features a plurality of universal card slots (UCS) 72 for housing network or user equipment interface cards 74, which include input/output ports 14. The interface cards 74 include cards such as end system cards which terminate or originate ATM connections, and cell relay cards which take incoming ATM cells, translate their VPI/VCI values, transport the cells to the switching core 64 so that the cells can be routed to another cell relay card (i.e., an egress card) which transmits the cells to the next network element.

The peripheral shelf 70 also houses system cards, including a control card 76, one or more SVC service cards 78 and a hub card 80. The hub card 80 multiplexes a plurality of 200 Mb/s "add" buses 82 from the various interface cards on a particular peripheral shelf 70 onto a high speed 800 Mb/s "intershelf link" (ISL) bus 84 connecting the shelf 70 with the switching core 64. The hub card 80 also terminates the ISL bus 84 from the switching core 64 and drives a multi-drop bus 86 connected to each UCS 72 on shelf 70. In this manner, any interface or system card can communicate with any another interface or system card, irrespective of which peripheral shelves the communicating cards reside.

Figure 7B:
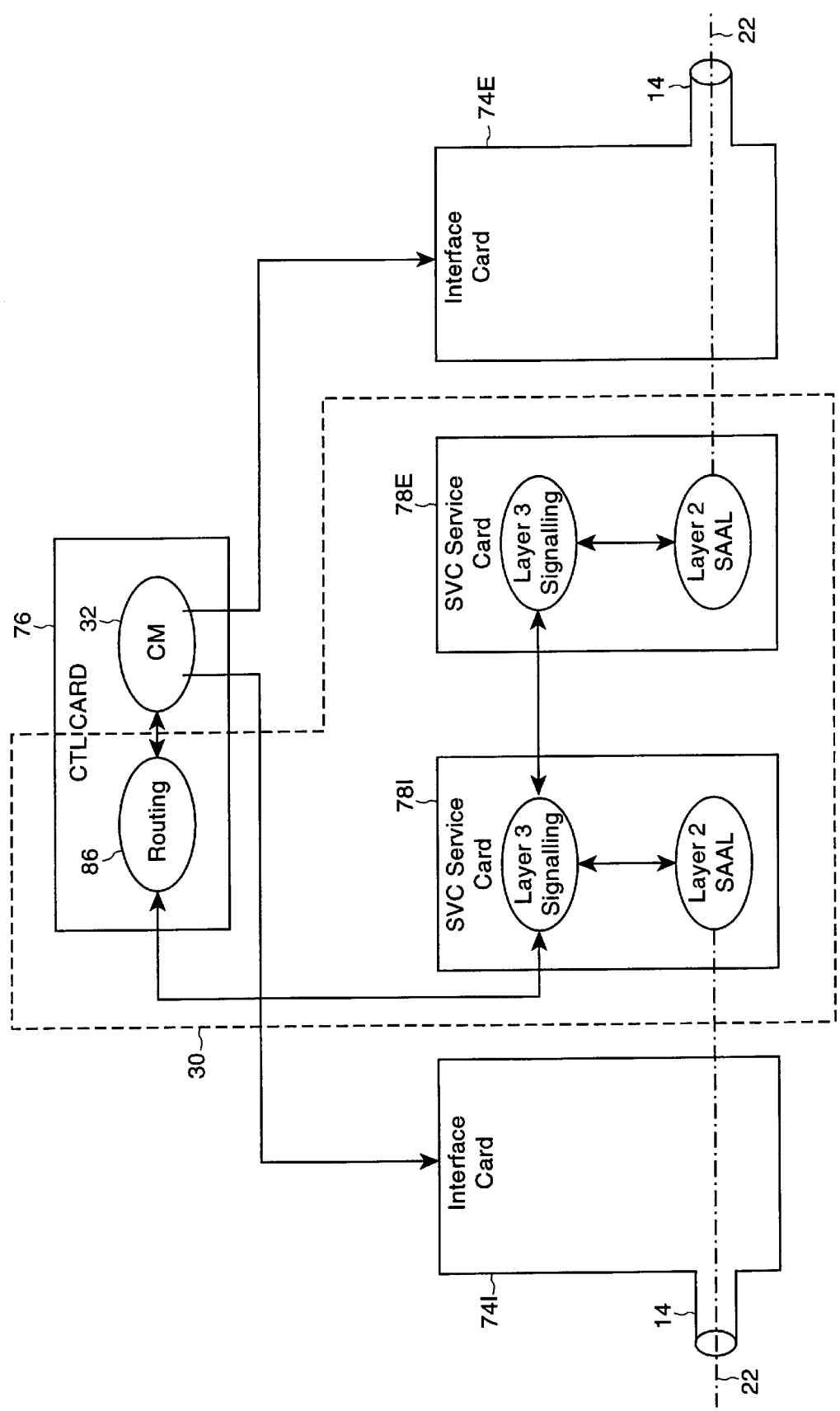
FIG. 7B is a system block diagram of the software architecture of the preferred network element.

FIG. 7B is a software architecture diagram in respect of the switch 10. As shown in FIG. 7B, the call control infrastructure 30 is executed in a distributed fashion by SVC service cards 78 and by the control card 76. The connection manager 32 is executed by the control card 76.

As illustrated in FIG. 7B, ingress interface card 74$_1$ routes all signalling ATM cells, e.g. cells featuring VPI/VCI=0/5, which arrive on signalling link 22 to ingress SVC service card 78$_1$. The SVC service cards 78 provide distributed signalling stacks, call processing, routing and billing for SVC services. When a call setup message is received by ingress SVC service card 78$_1$, an ATM layer 3 signalling module thereof communicates with the control card 76 to determine if the call should be accepted. The control card executes a connection and admission control function (not shown) to determine if the switch 10 has sufficient bandwidth and internal resources to accept the new call. If the new call is accepted, the control card 76 executes a centralized routing function 86 (employing routing table 16 of FIG. 1) which selects an egress trunk group on egress card 74E and communicates this information to the connection manager 32. Alternatively, in source routing, the egress trunk group is provided in the call setup message and the routing function merely passes this information to the connection manager 32. In any event, the connection manager 32 selects a free VCI on the egress trunk group, and instructs the ingress and egress interface cards 74 to switch incoming ATM cells featuring an input port/VPI/VCI address to the egress port/VPI/VCI address selected by the control card 76, to thereby establish a bearer channel cross-connect. The connection manager 32 also maintains the cross-connect table shown for example in FIG. 5, in order to record all cross-connects existing on the switch 10.

Figure 8:
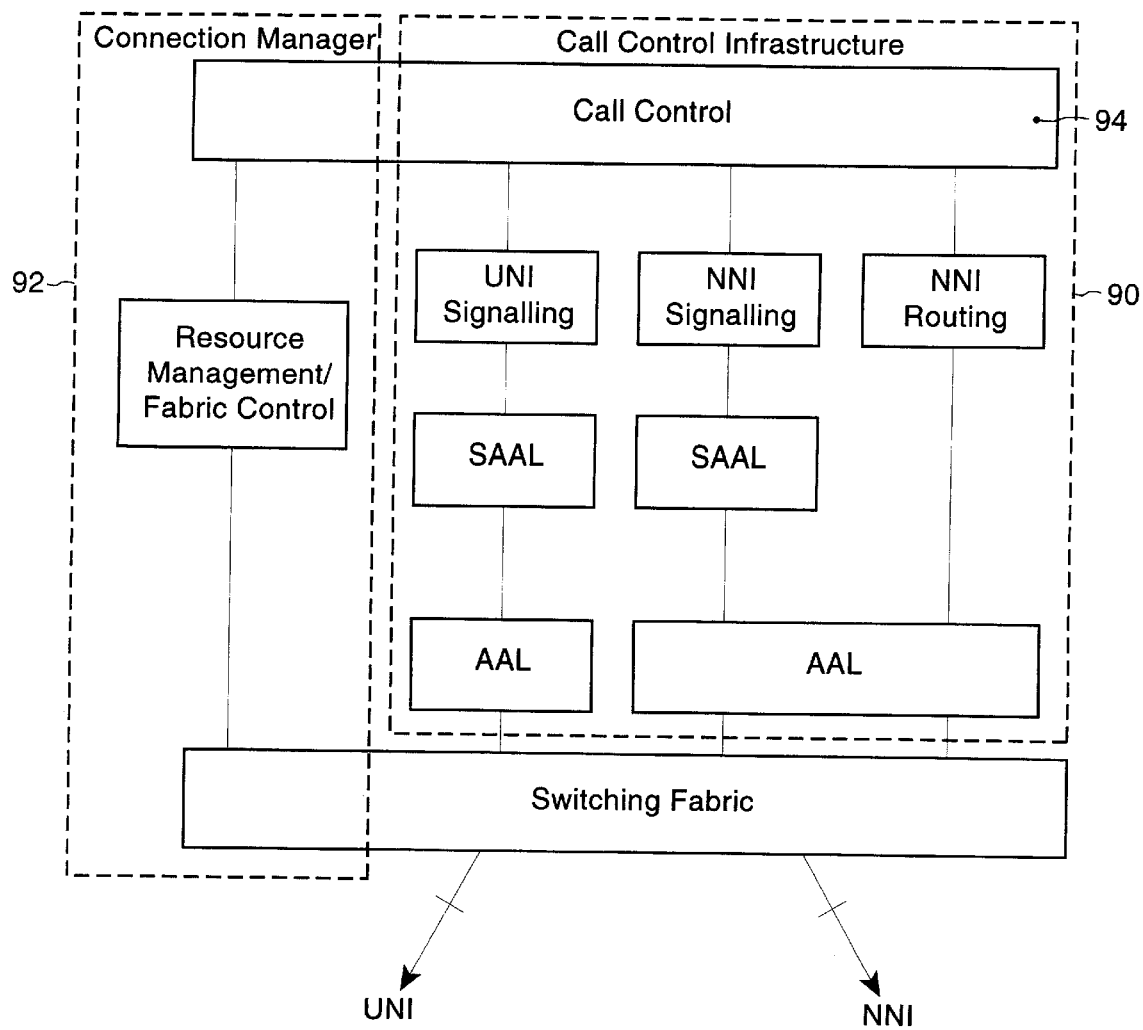
FIG. 8 is a diagram of the control and user planes of an ATM protocol stack as implemented by the preferred network element.

FIG. 8 maps the functionality of various components of switch 10 onto the various layers of the ATM protocol stack for a typical switch. As shown in FIG. 8, the protocol stack is segmented onto a control plane 90, which is preferably implemented by call control infrastructure 30, and a user plane 92, which is preferably implemented by connection manager 32. The control plane 90 can be further segmented into a call control layer 94 which is executed by the control card 76 (FIG. 7) and the remaining layers of the protocol stack, exclusive of the switching fabric, which are executed by the SVC service cards 78.

The control card 76 also monitors SVC service cards 78 to determine whether or not they are functioning. The monitoring is preferably accomplished through a periodic polling procedure between the control card 76 and SVC cards 78 which communicate over a virtual control channel using buses 82, 84 and 86. In the event of a failure in the SVC service card, the control card 76 will switch a backup SVC service card 78' (see FIG. 7A) into service in order to provide an N+1 warm redundancy capability.

Figure 9:
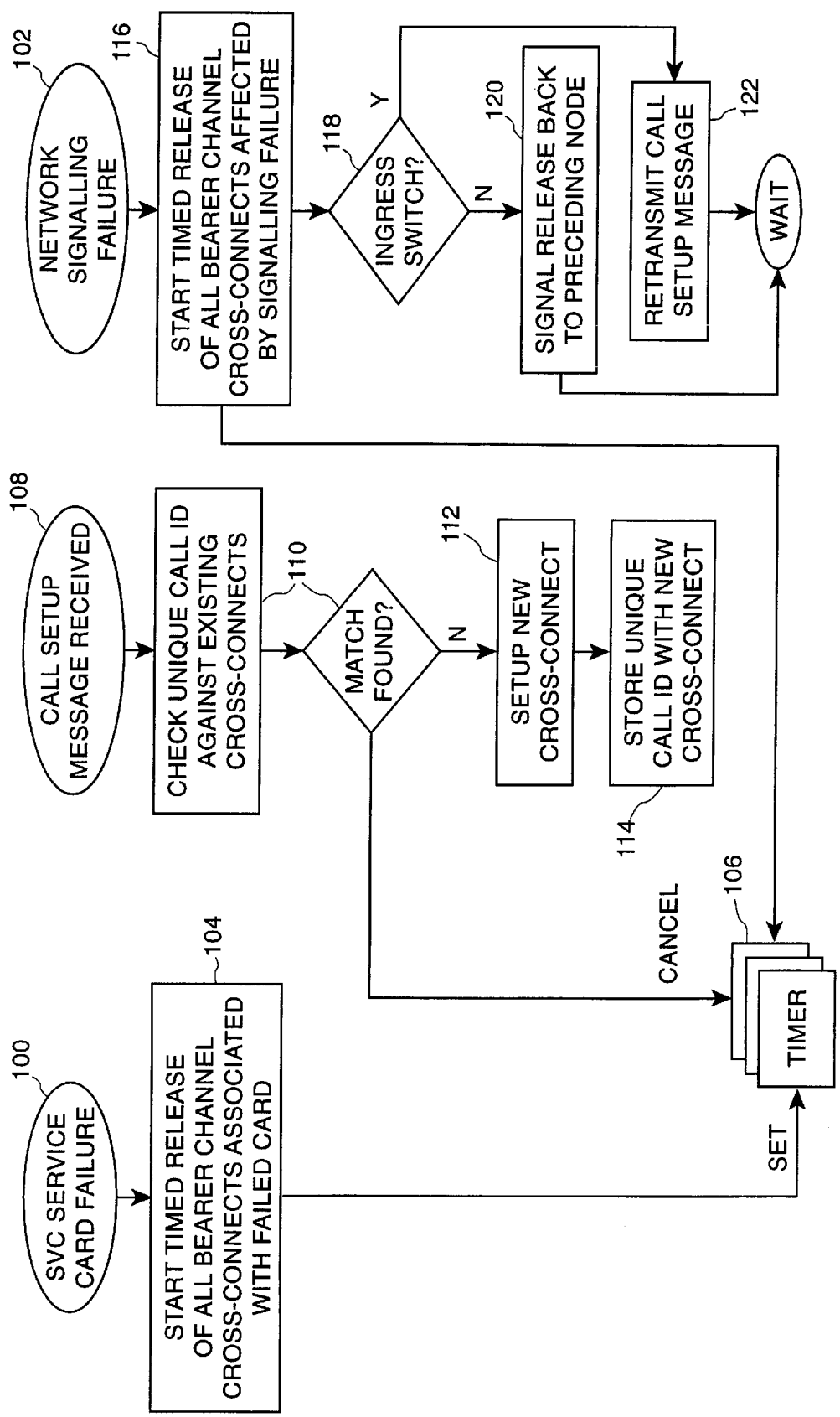
FIG. 9. is a state diagram illustrating the preferred steps taken by a given network element for maintaining the survivability of bearer channel cross-connects in the event of a recoverable failure in the signalling network.

FIG. 9 illustrates the preferred steps taken by switch 10 for maintaining the survivability of the bearer channel cross-connects 20 in the event of a recoverable failure in the signalling network. As seen in FIG. 9, switch 10 distinguishes between two types of failure events, event 100 wherein the control card 76 detects a failure of a given SVC service card 78, and event 102 wherein the call control infrastructure 30 detects a failure in the signalling network arising from other switches. When event 100 occurs, the call control infrastructure 30 signals, at step 104, a timer module 106 (which is associated with connection manager 32) to begin the timed release of all bearer channel cross-connects affected by the failed service card. This is possible because the connection manager 32 of control card 76 maintains the cross-connect table such as illustrated in FIG. 5. Later, if replacement SVC service card 78' is brought into service and, at event 108, a call setup message is received which, at step 110, matches the unique call identifier of a surviving cross-connect, the timer module 106 is instructed to abort the release of the surviving cross-connect and thereby reclaim it provided the next hop signalling link is functioning. However, if at step 110 no match is found or the signalling link for the old cross-connect is not usable, if it is possible to re-route the call, the connection manager 32 establishes at step 112 a new cross-connect as described above in respect of the new call, and at step 114 stores the unique call identifier forwarded in the call setup message in the cross-connect table with the newly created cross-connect. Otherwise, the call can be cranked back in a conventional manner to previous nodes to attempt re-routing of the call.

The steps taken when event 102 occurs correspond to similar steps shown in the FIG. 3 network flow chart. Briefly, at step 116 the call control infrastructure 30 instructs timer 106 (which is associated with connection manager 32) to start the timed release of all bearer channel cross-connects affected by the signalling failure. At step 118, the call control infrastructure 30 queries whether it is the ingress point in the network 8 for any of the calls affected by the signalling failure. If it is not, at step 120 the call control infrastructure 30 signals a call release message, as described above, back to the preceding node. However, if the switch is the ingress point into the network for any of the calls affected by the signalling failure, the call control infrastructure re-signals a call setup message at step 122, including the unique call identifier, across the network for each affected call.

The foregoing detailed description, as well as the claims below, have employed a variety of descriptive or functional terms to describe actions between various components. For example, one network element may "signal" another network element. It will be understood by those skilled in the art that such terms should be construed to encompass a variety of programmed mechanisms which can be used to implement the action. For example, a component may signal another component by the mechanism of transmitting bits there between. However, a component may signal another component by the mechanism of omitting to transmit bits when the other component is programmed to time-out waiting to receive the bits.

The preferred embodiment has also made specific reference to SVC service. Those skilled in the art will appreciate that the preferred embodiment can be adapted to circumstances where the bearer channel is a soft permanent virtual connection (SPVC), wherein network elements are configured to use the signalling network to establish a connection across the network (although the signalling is not extended to the CPE). Those skilled in the art will also appreciate that while reference has been made to a point-to-point call, the preferred method may be applied multiple times to a signalling failure affecting a point-to-multipoint call, which in effect comprises a plurality of point-to-point calls originating from the same source. Similarly, those skilled in the art will appreciate that numerous other modifications and alternatives may be made to the preferred embodiment, which has made reference to the proprietary architecture and configuration of a Newbridge 36170 MainStreet Xpress (TM) switch, without departing from the spirit and scope of the invention.

We claim:

1. A method of re-establishing a communications connection in a network element after a failure occurs affecting said communications connection, said network element being one of at least one network element in a switched connection communications network over which said communications connection is provisioned in a source-to-destination bearer path, said bearer path including a cross-connection in said first-mentioned network element, said cross-connection being associated with said communications connection prior to said failure at a time when said communications connection is provisioned, said method comprising the steps of:

(a) delaying release of said cross-connection following said failure; and (b) during said delayed release, determining whether said cross-connection remains operable notwithstanding said failure and, if so, re-associating said operable cross-connection with said communications connection to thereby re-establish same over at least that portion of said bearer path which comprises said cross-connection.

2. The method of re-establishing a communications connection in a network element after a failure as claimed in claim 1, wherein said determining whether said cross-connection remains operable notwithstanding said failure includes determining whether said first-mentioned network element is capable of communicating with an immediately adjacent network element in said bearer path.

3. The method of re-establishing a communications connection in a network element after a failure as claimed in claim 2, wherein said switched connection communications network includes a signalling network for establishing, maintaining and clearing a communications connection in said switched connection communications network and wherein said failure occurs in said signalling network.

4. The method of re-establishing a communications connection in a network element after a failure as claimed in claim 3, wherein said failure occurs in a card associated with said signalling network at said first-mentioned network element.

5. The method of re-establishing a communications connection in a network element after a failure as claimed in claim 3, wherein, following said failure and prior to said step (a), said switched connection communications network indicates existence of said failure to said first-mentioned network element to release said cross-connection following said failure and wherein said step (a) of delaying release of said cross-connection following said failure occurs for a pre-determined period of time.

6. The method of re-establishing a communications connection in a network element after a failure as claimed in claim 5, wherein said switched connection communications network includes a call control infrastructure and said method further comprising the step of:
   (a1) releasing said communications connection from said call control infrastructure following said failure and prior to said step (b).

7. The method of re-establishing a communications connection in a network element after a failure as claimed in claim 6, said call control infrastructure is disposed on said first-mentioned network element.

8. The method of re-establishing a communications connection in a network element after a failure as claimed in claim 7, wherein said call control infrastructure indicates existence of said failure to a network element of said at least one network element in said bearer path to release a cross-connection in said network element to which said failure is indicated following said failure.

9. The method of re-establishing a communications connection in a network element after a failure as claimed in claim 8, wherein said network element to which said failure is indicated is not customer premise equipment.

10. The method of re-establishing a communications connection in a network element after a failure as claimed in claim 9, wherein said signalling network includes an interface for communicating signalling information between said at least one network element in said bearer path.

11. The method of re-establishing a communications connection in a network element after a failure as claimed in claim 10, wherein said interface comprises a signalling link.

12. The method of re-establishing a communications connection in a network element after a failure as claimed in claim 11, wherein said first-mentioned network element includes a connection manager disposed on said first-mentioned network element for creating and dismantling cross-connections thereon.

13. The method of re-establishing a communications connection in a network element after a failure as claimed in claim 6, said method further comprising the step of:
   (b1) if said communications connection is re-established over said portion of said bearer path which comprises said cross-connection within said pre-determined period of time, aborting said release of said cross-connection for said first-mentioned network element.

14. The method of re-establishing a communications connection in a network element after a failure as claimed in claim 13, wherein, following said failure, said switched connection communications network transmits a setup message to said first-mentioned network element to initiate said step (b).

15. The method of re-establishing a communications connection in a network element after a failure as claimed in claim 14, wherein said cross-connection is associated with said communications connection at said time when said communications connection is provisioned by associating said cross-connection with a unique identifier in respect of said communications connection.

16. The method of re-establishing a communications connection in a network element after a failure as claimed in claim 15, wherein said setup message includes said unique identifier and wherein said operable cross-connection is re-associated with said communications connection by re-associating said cross-connection with said unique identifier.

17. The method of re-establishing a communications connection in a network element after a failure as claimed in claim 16, wherein said communications connection has an ingress network element and an egress network element in said switched connection communications network and wherein said setup message is transmitted in said switched connection communications network by one of said ingress network element and said egress network element.

18. The method of re-establishing a communications connection in a network element after a failure as claimed in claim 17, said unique identifier comprises a field representative of said ingress network element and a field representative of a number which is unique with respect to said communications connection.

19. The method of re-establishing a communications connection in a network element after a failure as claimed in claim 18, said unique identifier further comprises a field representative of a creator of said communications connection.

20. The method of re-establishing a communications connection in a network element after a failure as claimed in claim 16, wherein said re-associating said cross-connection with said unique identifier comprises linking said unique identifier with an entry in a data structure representing existing cross-connections on said first-mentioned network element.

21. The method of re-establishing a communications connection in a network element after a failure as claimed in claim 3, wherein said communications connection is a switched virtual connection.

22. The method of re-establishing a communications connection in a network element after a failure as claimed in claim 3, wherein said communications connection is a soft permanent virtual connection.

23. The method of re-establishing a communications connection in a network element after a failure as claimed in claim 3, wherein if said first-mentioned network element determines that said cross-connection is not operable, said first-mentioned network element establishes an alternate cross-connection for said communications connection and re-routes said communications connection in said switched connection communications network.

24. A network element for use in re-establishing a communications connection after a failure occurs affecting said communications connection, said network element being one of at least one network element in a switched connection communications network over which said communications connection is provisioned in a source-to-destination bearer path, said bearer path including a cross-connection in said first-mentioned network element, said cross-connection being associated with said communications connection prior to said failure at a time when said communications connection is provisioned, said network element comprising:
a cross-connection release unit for delaying release of said cross-connection following said failure; and
a cross-connection re-association unit for re-associating, during said delayed release, said cross-connection with said communications connection to thereby re-establish same over at least that portion of the bearer path which comprises said cross-connection if said cross-connection remains operable notwithstanding said failure.

25. A network element for use in re-establishing a communications connection after a failure as claimed in claim 24, wherein said switched connection communications network includes a signalling network for establishing, maintaining and clearing a communications connection in said switched connection communications network and wherein said failure occurs in said signalling network.

26. A network element for use in re-establishing a communications connection after a failure as claimed in claim 25, wherein said switched connection communications network indicates existence of said failure to said first-mentioned network element to release said cross-connection following said failure, said indication to trigger said cross-connection release unit to delay said release for a pre-determined period of time.

27. A network element for use in re-establishing a communications connection after a failure as claimed in claim 26, wherein said switched connection communications network includes a call control infrastructure and said first-mentioned network element is operative to release said communications connection from said call control infrastructure following said failure and prior to said cross-connection re-association unit re-associating said operable cross-connection with said communications connection.

28. A network element for use in re-establishing a communications connection after a failure as claimed in claim 27, wherein said call control infrastructure is disposed on said first-mentioned network element and includes said cross-connection re-association unit.

29. A network element for use in re-establishing a communications connection after a failure as claimed in claim 28, wherein said call control infrastructure is operative to indicate existence of said failure to a network element of said at least one network element in said bearer path to release a cross-connection in said network element to which said failure is indicated following said failure.

30. A network element for use in re-establishing a communications connection after a failure as claimed in claim 29, wherein said network element to which said failure is indicated is not customer premise equipment.

31. A network element for use in re-establishing a communications connection after a failure as claimed in claim 30, wherein said signalling network includes an interface for communicating signalling information between said at least one network element in said bearer path.

32. A network element for use in re-establishing a communications connection after a failure as claimed in claim 31, wherein said interface comprises a signalling link.

33. A network element for use in re-establishing a communications connection after a failure as claimed in claim 32, wherein said first-mentioned network element includes a connection manager disposed on said first-mentioned network element and said connection manager includes said cross-connection release unit.

34. A network element for use in re-establishing a communications connection after a failure as claimed in claim 27, wherein said cross-connection re-association unit is operative to abort said release of said cross-connection for said first-mentioned network element if said communications connection is re-established over said portion of said bearer path which comprises said cross-connection within said pre-determined period of time.

35. A network element for use in re-establishing a communications connection after a failure as claimed in claim 34, wherein, following said failure, said switched connection communications network transmits a setup message to said first-mentioned network element to trigger said cross-connection re-association unit to re-associate said operable cross-connection with said communications connection.

36. A network element for use in re-establishing a communications connection after a failure as claimed in claim 35, wherein said cross-connection is associated with said communications connection at said time when said communications connection is provisioned by associating said cross-connection with a unique identifier in respect of said communications connection.

37. A network element for use in re-establishing a communications connection after a failure as claimed in claim 36, wherein said setup message includes said unique identifier and wherein said cross-connection re-association unit re-associates said communications connection with said cross-connection by re-associating said cross-connection with said unique identifier.

38. A network element for use in re-establishing a communications connection after a failure as claimed in claim 37, wherein said communications connection has an ingress network element and an egress network element in said switched connection communications network and wherein said setup message is transmitted in said switched connection communications network by one of said ingress network element and said egress network element.

39. A network element for use in re-establishing a communications connection after a failure as claimed in claim 38, wherein said unique identifier comprises a field representative of said ingress network element and a field representative of a number which is unique with respect to said communications connection.

40. A network element for use in re-establishing a communications connection after a failure as claimed in claim 39, wherein said unique identifier further comprises a field representative of a creator of said communications connection.

41. A network element for use in re-establishing a communications connection after a failure as claimed in claim 37, wherein said cross-connection re-association unit is operative to re-associate said cross-connection with said unique identifier by linking said unique identifier with an entry in a data structure representing existing cross-connections on said first-mentioned network element.

42. A network element for use in re-establishing a communications connection after a failure as claimed in claim 25, wherein said communications connection is a switched virtual connection.

43. A network element for use in re-establishing a communications connection after a failure as claimed in claim 25, wherein said communications connection is a soft permanent virtual connection.

44. A network element for use in re-establishing a communications connection after a failure as claimed in claim 25, wherein said cross-connection re-association unit is operative to establish an alternate cross-connection for said communications connection and to re-route said communications connection in said switched connection communications network if said first-mentioned network element determines that said cross-connection is not operable.

45. A switched connection communications network for use in re-establishing a communications connection after a failure occurs affecting said communications connection, said switched connection communications network comprising:
 a failure detection unit for detecting a failure in said switched connection communications network; and
 at least one network element over which a bearer path of said communications connection is provisioned, said bearer path including a cross-connection respectively in each of said at least one network element, each said cross-connection being associated with said communications connection prior to said failure at a time when said communications connection is provisioned, wherein each said network element in said bearer path is operative:
  (a) to delay release of said cross-connection thereof following said failure; and
  (b) during said delayed release, to determine whether said cross-connection remains operable notwithstanding said failure and, if so, to re-associate said operable cross-connection with said communications connection to thereby re-establish same over at least that portion of said bearer path which comprises said cross-connection.

46. A switched connection communications network for use in re-establishing a communications connection after a failure as claimed in claim 45, wherein determining whether said cross-connection remains operable notwithstanding said failure includes determining whether said first-mentioned network element is capable of communicating with an immediately adjacent network element in said bearer path.

47. A switched connection communications network for use in re-establishing a communications connection after a failure as claimed in claim 46, said switched connection communications network further comprising a signalling network for establishing, maintaining and clearing a communications connection in said switched connection communications network and wherein said failure occurs in said signalling network.

48. A switched connection communications network for use in re-establishing a communications connection after a failure as claimed in claim 47, wherein said switched connection communications network is operative to indicate existence of said failure to a first network element of said at least one network element said bearer path to release its said cross-connection following said failure and wherein said first network element is operative to delay said release of its said cross-connection for a pre-determined period of time.

49. A switched connection communications network for use in re-establishing a communications connection after a failure as claimed in claim 48, wherein each said network element comprises a call control infrastructure and wherein said first network element is operative to release said communications connection from its said call control infrastructure following said failure and prior to re-associating its said operable cross-connection with said communications connection.

50. A switched connection communications network for use in re-establishing a communications connection after a failure as claimed in claim 49, wherein said call control infrastructure of said first network element is operative to indicate existence of said failure to a network element of said at least one network element in said bearer path.

51. A switched connection communications network for use in re-establishing a communications connection after a failure as claimed in claim 50, wherein said network element to which said failure is indicated is not customer premise equipment.

52. A switched connection communications network for use in re-establishing a communications connection after a failure as claimed in claim 51, wherein said signalling network includes an interface for communicating signalling information between said at least one network element in said bearer path.

53. A switched connection communications network for use in re-establishing a communications connection after a failure as claimed in claim 52, wherein said interface comprises a signalling link.

54. A switched connection communications network for use in re-establishing a communications connection after a failure as claimed in claim 53, wherein each said at least one network element in said bearer path includes a connection manager disposed thereon for creating and dismantling cross-connections thereon.

55. A switched connection communications network for use in re-establishing a communications connection after a failure as claimed in claim 50, wherein said first network element is operative to abort said release of its said cross-connection if said first network element re-establishes said cross-connection over said portion of said bearer path which comprises said cross-connection within said pre-determined period of time.

56. A switched connection communications network for use in re-establishing a communications connection after a failure as claimed in claim 55, wherein, following said failure, said switched connection communications network transmits a setup message to said first network element to trigger said first network element to determine whether said cross-connection remains operable notwithstanding said failure and, if so, to re-associate said operable cross-connection with said communications connection.

57. A switched connection communications network for use in re-establishing a communications connection after a failure as claimed in claim 56, wherein said cross-connection is associated with said communications connection at said time when said communications connection is provisioned by associating said cross-connection with a unique identifier in respect of said communications connection.

58. A switched connection communications network for use in re-establishing a communications connection after a failure as claimed in claim 57, wherein said setup message includes said unique identifier and wherein said first network element is operative to re-associate said operable cross-connection with said communications connection by re-associating said cross-connection with said unique identifier.

59. A switched connection communications network for use in re-establishing a communications connection after a failure as claimed in claim 58, wherein said communications connection has an ingress network element and an egress network element in said switched connection communications network and wherein said setup message is transmitted in said switched connection communications network by one of said ingress network element and said egress network element.

60. A switched connection communications network for use in re-establishing a communications connection after a failure as claimed in claim 59, wherein said unique identifier comprises a field representative of said ingress network element and a field representative of a number which is unique with respect to said communications connection.

61. A switched connection communications network for use in re-establishing a communications connection after a failure as claimed in claim 60, wherein said unique identifier further comprises a field representative of a creator of said communications connection.

62. A switched connection communications network for use in re-establishing a communications connection after a failure as claimed in claim 59, wherein said first network element is operative to re-associate said cross-connection with said unique identifier by linking said unique identifier with an entry in a data structure representing existing cross-connections on said first network element.

63. A switched connection communications network for use in re-establishing a communications connection after a failure as claimed in claim 47, wherein said communications connection is a switched virtual connection.

64. A switched connection communications network for use in re-establishing a communications connection after a failure as claimed in claim 47, wherein said communications connection is a soft permanent virtual connection.

65. A switched connection communications network for use in re-establishing a communications connection after a failure as claimed in claim 47, wherein said first network element is operative to establish an alternate cross-connection for said communications connection and to re-route said communications connection in said switched connection communications network if said first network element determines that said cross-connection is not operable.

* * * * *